US012723950B2

(12) United States Patent
Khosravani

(10) Patent No.: US 12,723,950 B2
(45) Date of Patent: Sep. 1, 2026

(54) LIGHTNING SWEPT STROKE SIMULATOR DEVICES AND METHODS

(71) Applicant: The Boeing Company, Arlington, VA (US)

(72) Inventor: Shahriar Khosravani, Everett, WA (US)

(73) Assignee: The Boeing Company, Arlington, VA (US)

( * ) Notice: Subject to any disclaimer, the term of this patent is extended or adjusted under 35 U.S.C. 154(b) by 317 days.

(21) Appl. No.: 18/733,657

(22) Filed: Jun. 4, 2024

(65) Prior Publication Data

US 2025/0369831 A1 Dec. 4, 2025

(51) Int. Cl.
*G01M 99/00* (2011.01)
*B64F 5/60* (2017.01)

(52) U.S. Cl.
CPC ............... *G01M 99/00* (2013.01); *B64F 5/60* (2017.01)

(58) Field of Classification Search
CPC ...... G01M 5/0091; G01M 99/00; B64D 45/02
See application file for complete search history.

(56) References Cited

U.S. PATENT DOCUMENTS 5,777,479 A * 7/1998 Kuhlman ............. G01R 31/001 324/452
9,514,917 B1 * 12/2016 McIver .................... H05H 1/52
10,739,395 B2 * 8/2020 Khosravani ........ G01R 29/0842

* cited by examiner

*Primary Examiner* — Erika J. Villaluna
(74) *Attorney, Agent, or Firm* — Kolitch Romano Dascenzo Gates LLP

(57) ABSTRACT

Lightning swept stroke simulator devices comprise a first dielectric structure defining a first elongate slit, a second dielectric structure defining a second elongate slit, and an electrode positioned relative to the first dielectric structure and the second dielectric structure and configured to be operatively coupled to a voltage source. The first dielectric structure and the second dielectric structure are configured to be selectively moved relative to each other so that the first elongate slit and the second elongate slit overlap and collectively define an aperture that extends through the first dielectric structure and the second dielectric structure and that translates linearly along the first dielectric structure and the second dielectric structure.

20 Claims, 3 Drawing Sheets

10
200
32
28
18
14
24
30

10
200
32
28
18
24
14
30

10
200
14
32
28
18
24
30

10
200
14
32
28
24
18
30

LIGHTNING SWEPT STROKE SIMULATOR DEVICES AND METHODS

FIELD

The present disclosure relates to simulating lightning swept strokes.

BACKGROUND

Lightning strikes on airborne aircraft results in a deformed lightning, or plasma, channel that is displaced along the outer surface of the aircraft. This phenomenon is referred to as lightning swept stroke. During a lightning swept stroke, the plasma is elongated in the direction of the aircraft's motion, extending toward the aft of the aircraft. Evaluating and testing this phenomenon in a representative manner poses challenges.

SUMMARY

Lighting swept stroke simulator devices and methods of simulating a lighting swept stroke are disclosed. Lightning swept stroke simulator devices comprise a first dielectric structure that defines a first elongate slit, a second dielectric structure that defines a second elongate slit, and an electrode that is positioned relative to the first dielectric structure and to the second dielectric structure and that is configured to be operatively coupled to a voltage source. The first dielectric structure and the second dielectric structure are configured to be selectively moved relative to each other so that the first elongate slit and the second elongate slit overlap and collectively define an aperture that extends through the first dielectric structure and the second dielectric structure and that translates linearly along the first dielectric structure and the second dielectric structure.

Methods of simulating a lightning swept stroke comprise moving a first dielectric structure that defines a first elongate slit and a second dielectric structure that defines a second elongate slit relative to each other so that the first elongate slit and the second elongate slit overlap and collectively define an aperture that extends through the first dielectric structure and the second dielectric structure and so that translates linearly along the first dielectric structure and the second dielectric structure. The methods further comprise, concurrently with the moving the first dielectric structure and the second dielectric structure, applying a voltage across the aperture between an electrode and a test structure so that a plasma channel is formed through the aperture as it translates linearly.

DESCRIPTION

Figure 1:
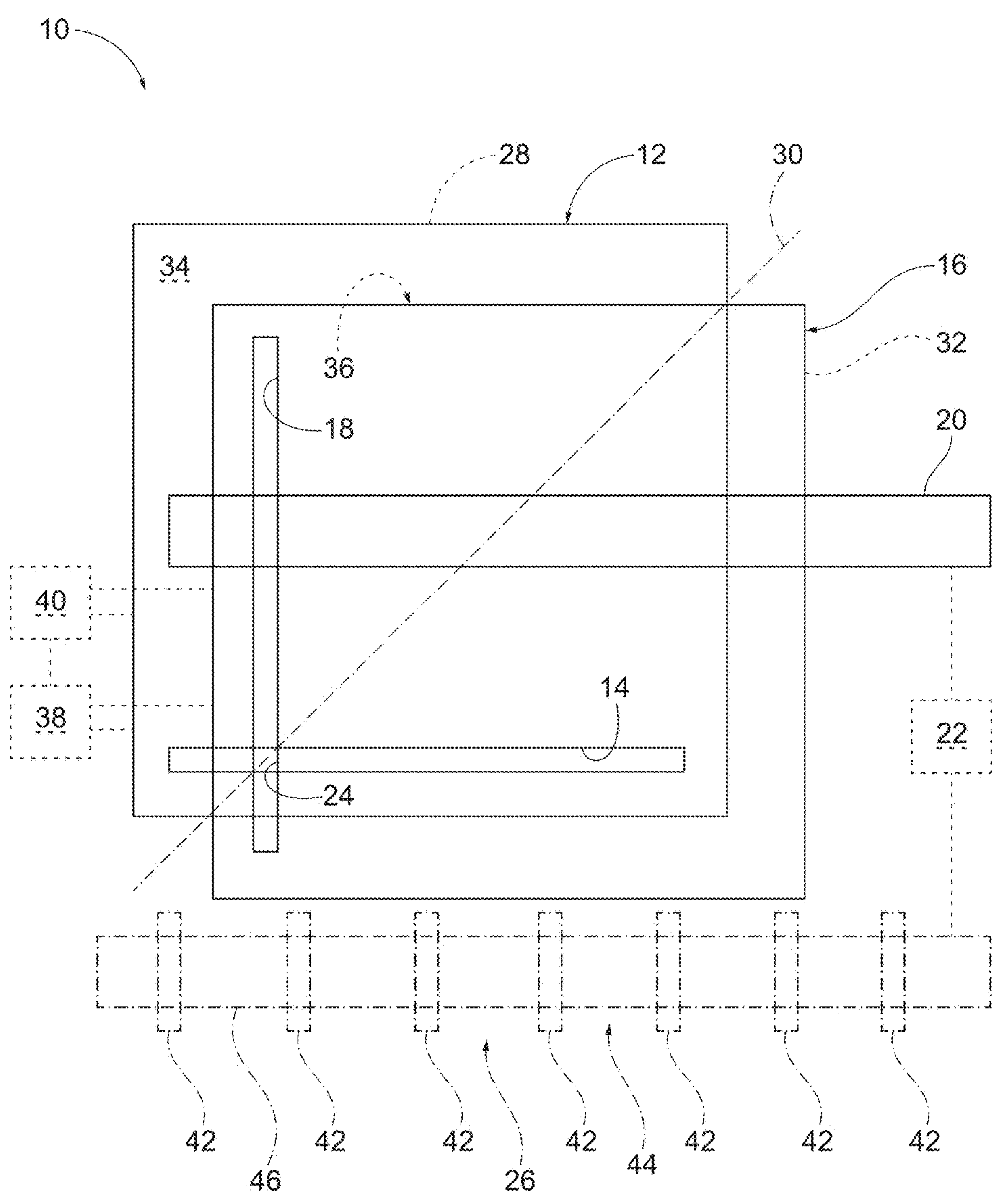
FIG. 1 is a schematic diagram representing lightning swept stroke simulator devices according to the present disclosure.
Figures 2A, 2B, 2C, 2D:
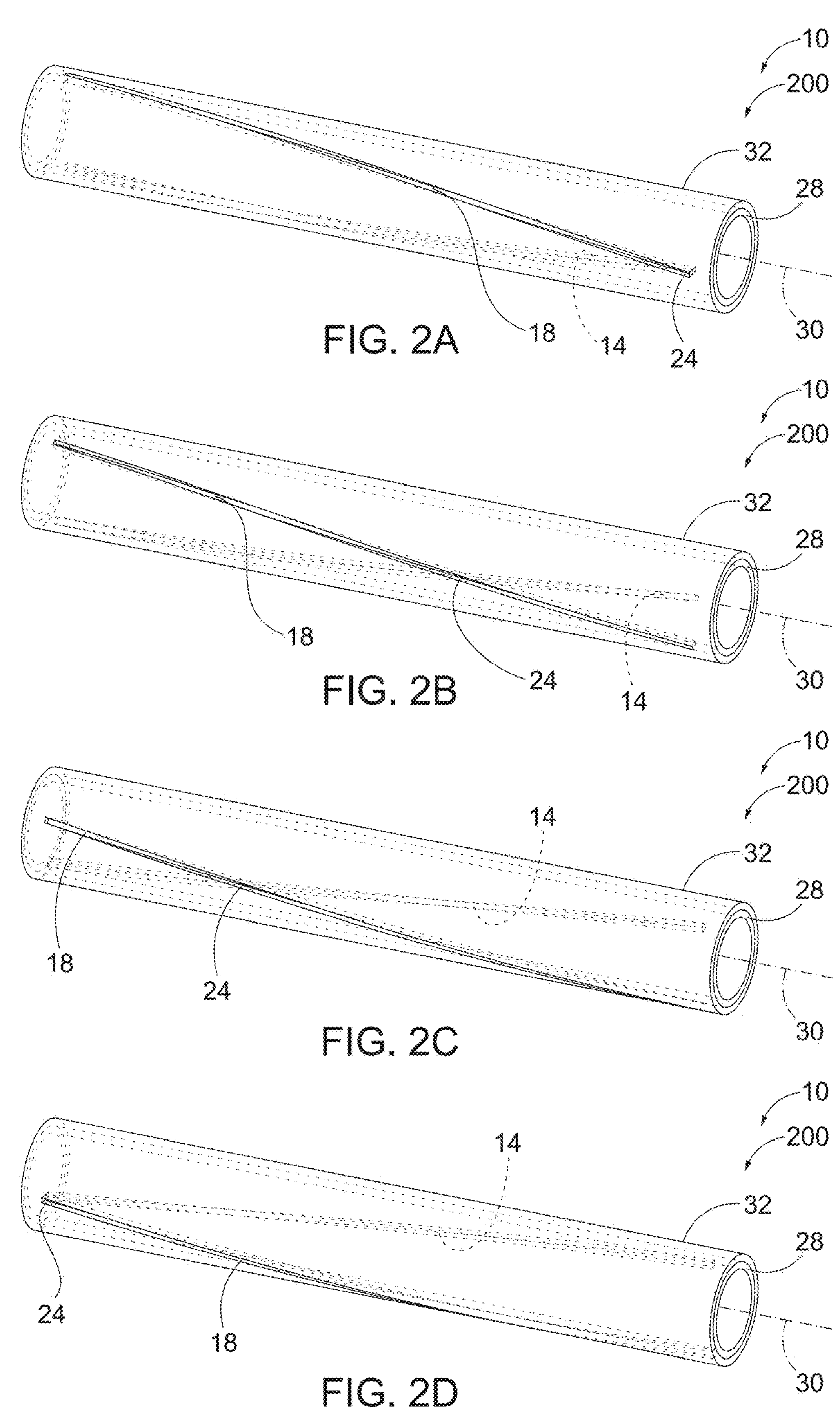
FIGS. 2A-2D are sequential isometric views of a portion of an example lightning swept stroke simulator device according to the present disclosure, showing counter rotation of two hollow cylinders with elongate slits and the corresponding translation of an aperture defined by the two elongate slits.

FIG. 1 schematically illustrates lightning swept stroke simulator devices 10 according to the present disclosure. Generally, in FIG. 1, elements that are likely to be included in a given example are illustrated in solid lines, while elements that are optional to a given example or that correspond to a specific example are illustrated in broken lines. However, elements that are illustrated in solid lines are not essential to all examples of the present disclosure, and an element shown in solid lines may be omitted from a particular example without departing from the scope of the present disclosure.

As schematically represented in FIG. 1, lightning swept stroke simulator devices 10 comprise at least a first dielectric structure 12, a second dielectric structure 16, and an electrode 20 that is positioned relative to the first dielectric structure 12 and the second dielectric structure 16. The electrode 20 is configured to be operatively coupled to a voltage source 22. The first dielectric structure 12 defines a first elongate slit 14, and the second dielectric structure 16 defines a second elongate slit 18. The first dielectric structure 12 and the second dielectric structure 16 are configured to be selectively moved relative to each other so that the first elongate slit 14 and the second elongate slit 18 overlap and collectively define an aperture 24 that extends through the first dielectric structure 12 and the second dielectric structure 16. As the first dielectric structure 12 and the second dielectric structure 16 move relative to each other with the first elongate slit 14 and the second elongate slit 18 overlapping, the aperture 24 translates linearly along the first dielectric structure 12 and the second dielectric structure 16. In other words, the aperture 24 is geometrically defined by the first elongate slit 14 and the second elongate slit 18 and translates linearly, with the physical structure that defines the aperture 24 being dynamic and not static, as the first dielectric structure 12 and the second dielectric structure 16 move relative to each other. As a result of the geometry of the first elongate slit 14 and the second elongate slit 18, the aperture 24 may be translated linearly at a broad range of velocities, including subsonic and supersonic velocities.

The first dielectric structure 12 and the second dielectric structure 16 may be constructed from any suitable dielectric, or insulating, material, such as (but not limited to) acrylonitrile butadiene styrene (ABS).

Although not required in all examples, the first elongate slit 14 and the second elongate slit 18 generally have uniform widths along their lengths, such as widths in the range of 5-15 millimeters (mm). The lengths of the elongate slits 14, 18 may be selected for a particular application, such as based on the lightning environment being simulated, the structure being tested, etc. As illustrative examples, the elongate slits 14, 18 may have lengths in the range of 10-500 centimeters (cm). However, dimensions of the elongate slits 14, 18 outside of these ranges also may be used depending on the application of the lightning swept stroke simulator device 10.

Some lightning swept stroke simulator devices 10 further comprise the voltage source 22 operatively coupled to the electrode 20. When present, the voltage source 22 is configured to be operatively coupled to, or is operatively coupled to, a test structure 26. The test structure 26 itself may be considered a component of a lightning swept stroke simulator device 10. The test structure 26 additionally or alternatively may be described as or referred to as a test coupon. When operatively present, the test structure 26 is exposed to the electrode 20 only through the aperture 24. Accordingly, when the electrode 20 and the test structure 26 both are operatively coupled to the voltage source 22, a plasma channel may form through the aperture 24 between the electrode 20 and the test structure 26, thereby simulating a lightning strike. As the aperture 24 translates, the simulated lightning strike is swept along the test structure 26, resulting in a lightning swept stroke. That is, as the aperture 24 translates, the plasma channel elongates with an effective length far beyond that which is formed with stationary prior art systems.

The test structure 26 may be any structure desired to be tested in connection with lightning swept strokes. For example, the test structure 26 may comprise an aerospace component 44. In some examples, the aerospace component 44 may comprise an aircraft skin 46. In some such examples, the aerospace component 44 further comprises fasteners 42 extending through the aircraft skin 46, as schematically represented in FIG. 1. In some examples, the test structure 26 comprises a composite material, such as a fiber-reinforced composite material. Other materials and types of test structures 26 also may be used with lightning swept stroke simulator devices 10 according to the present disclosure.

Depending on a desired lightning simulation being performed, the voltage applied by the voltage source 22 may be at least 50 kilovolts and optionally as great as 500 kilovolts or more. In practice, the voltage applied by the voltage source 22 may be less than 100 kilovolts with a current in the 50-100 kiloamp range utilizing a high voltage capacitor bank in parallel, whereas, prior art stationary plasma systems may require voltages as high as 3 megavolts (for every meter distance at sea level, air dielectric breakdown voltage (DBV) is about 3 MV/m and gradually drops with altitude).

With continued reference to the schematic representation of FIG. 1, in some examples the first dielectric structure 12 comprises a hollow cylinder 28 with a longitudinal axis 30, and the electrode 20 extends at least partially through the hollow cylinder 28. In such examples, the hollow cylinder 28 is configured to be selectively rotated about the longitudinal axis 30 relative to the second dielectric structure 16. Accordingly, the velocity of translation of the aperture 24 is based at least in part on the geometry of the first elongate slit 14 and the speed of rotation of the hollow cylinder 28.

In some such examples, the second dielectric structure 16 is planar, and the hollow cylinder 28 of the first dielectric structure 12 is positioned in close proximity to the planar second dielectric structure 16, such that the first elongate slit 14 and the second elongate slit 18 overlap to define the aperture as the hollow cylinder 28 rotates about its longitudinal axis 30. Herein, "close proximity" means within a distance in which a plasma channel will form and extend through the first elongate slit 14, the second elongate slit, and the aperture 24 from the electrode 20 to the test structure 26. In some examples, "close proximity" may be within 10 millimeters (mm), within 5 mm, within 1 mm, or within 0.5 mm.

In other examples, as also schematically represented in FIG. 1, the second dielectric structure 16 comprises a second hollow cylinder 32, and the first hollow cylinder 28 extends through and is coaxial with the second hollow cylinder 32. In such examples, an outer surface 34 of the first hollow cylinder 28 is in close proximity to an inner surface 36 of the second hollow cylinder 32, and the second hollow cylinder 32 is configured to be selectively rotated about the longitudinal axis 30 relative to the first hollow cylinder 28 in a direction opposite the first hollow cylinder 28. In other words, the two hollow cylinders 28, 32 rotate in opposite directions about the shared longitudinal axis 30, with the electrode 20 extending through the two hollow cylinders 28, 32 and with the test structure 26 positioned external of the two hollow cylinders 28, 32.

In such examples, at least one of the first elongate slit 14 and the second elongate slit 18 is non-parallel with the longitudinal axis 30, so that when the first elongate slit 14 and the second elongate slit 18 overlap, the aperture 24 will be defined and will translate along the first dielectric structure 12 and the second dielectric structure 16. In some such examples, the first elongate slit 14 is at least partially helical about the longitudinal axis 30, and in some examples, the second elongate slit 18 also is at least partially helical about the longitudinal axis 30. In some such examples, both the first elongate slit 14 and the second elongate slit 18 are at least partially helical about the longitudinal axis 30 and the first elongate slit 14 has an opposite handedness as the second elongate slit 18. In some examples, the first elongate slit 14 extends at least 90 degrees around the first hollow cylinder 28, and the second elongate slit 18 extends at least 90 degrees around the second hollow cylinder 32. In some examples, the second elongate slit 18 is a chiral of the first elongate slit 14. In some such examples, the aperture 24 therefore translates linearly from respective first end points to respective second end points of the first elongate slit 14 and the second elongate slit 18 as the first hollow cylinder 28 and the second hollow cylinder 32 rotate relative to each other in opposite directions.

In some examples, the elongate slits 14, 18 cross each other at 90 degrees, resulting in an aperture 24 that is a square. A square aperture 24 will restrict the plasma channel from moving around, whereas an aperture 24 with a non-right angle parallelogram shape gives the plasma channel more room to move around. However, higher angles (i.e., closer to 90 degrees) will lower the effective translational speed of the aperture 24 for a given rotational velocity of the hollow cylinders 28, 32. Accordingly, there is a trade-off—the more ideal the squareness of the aperture 24, the faster the hollow cylinders 28, 32 will have to rotate to achieve a desired translational velocity.

In examples with opposite handedness helical elongate slits 14, 18 extending 90 degrees around the respective hollow cylinders 28, 32 and 90 degrees relative to each other, the velocity, V, of the defined aperture 24 as the hollow cylinders 28, 32, rotate in opposite directions at a rotational speed, w, in rotations per minute (RPM), is defined by the following equation, where L is the length of the elongate slits 14, 18 along the longitudinal axis 30:

$$V = (2L\omega)/\pi$$

As an illustrative example, where L=1.9 meter (m), and ω=3000 RPM, a linear velocity of approximately 1.1 Mach for the aperture 24 is achieved.

During operative use of such lightning swept stroke simulator devices 10, the moving aperture 24 pulls the plasma channel and elongates it along the longitudinal axis 30 over the test structure 26. The opposing rotation of the hollow cylinders 28, 32 cancels out the Coanda effect and prevents the plasma channel from wrapping around the hollow cylinders 28, 32.

The peak voltage of the voltage source 22 determines the initial plasma channel length and the attachment distance to the test structure 26. Once the aperture 24 passes in front of the initial point on the test structure 26, the voltage of the electrode 20 must be equal to or higher than the ambient air's dielectric breakdown voltage (about 30 kilovolts per cm at sea level). However, once formed, the plasma channel may be elongated beyond a distance than otherwise would be possible at a given voltage in a stationary system.

In some examples, the first hollow cylinder 28 and the second hollow cylinder 32 are operatively coupled together to rotate in opposite directions about the longitudinal axis 30 at the same rate, such as via a single motor 40. For example, as schematically represented in FIG. 1, some lightning swept stroke simulator devices 10 further comprise a bevel gearbox 38 that is operatively coupled to the first hollow cylinder 28 and to the second hollow cylinder 32. Additionally or alternatively, some lightning swept stroke simulator devices 10 further comprise a motor 40 that is operatively coupled to the first hollow cylinder 28 and to the second hollow cylinder 32 and that is configured to operatively rotate the first hollow cylinder 28 and the second hollow cylinder 32 in opposite directions at the same rate.

Turning now to FIGS. 2A-2D, a portion of an illustrative non-exclusive example of a lightning swept stroke simulator device 10 in the form of lightning swept stroke simulator device 200 is illustrated. Where appropriate, the reference numerals from the schematic illustration of FIG. 1 are used to designate corresponding parts of the lightning swept stroke simulator device 200; however, the example of FIGS. 2A-2D is non-exclusive and does not limit lightning swept stroke simulator devices 10 to the illustrated embodiment of lightning swept stroke simulator device 200. That is, lightning swept stroke simulator devices 10 are not limited to the specific embodiment of the illustrated lightning swept stroke simulator device 200, and lightning swept stroke simulator devices 10 may incorporate any number of the various aspects, configurations, characteristics, properties, etc. of lightning swept stroke simulator devices 10 that are illustrated in and discussed with reference to the schematic representations of FIG. 1 and/or the embodiment of FIGS. 2A-2D, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to the lightning swept stroke simulator devices 200; however, it is within the scope of the present disclosure that the previously discussed features, variants, etc. may be utilized with the lightning swept stroke simulator devices 200.

Lightning swept stroke simulator device 200 is an example of a lightning swept stroke simulator device 10 that comprises a first hollow cylinder 28 with a helical first elongate slit 14 that extends 90 degrees around a longitudinal axis 30, and a second hollow cylinder 32 with a helical second elongate slit 18 having an opposite handedness of the helical first elongate slit 14 and that extends 90 degrees around the longitudinal axis 30.

FIGS. 2A-2D show in sequence the two hollow cylinders 28, 32 being rotated in opposite directions approximately 90 degrees from FIG. 2A to FIG. 2D and thus show the aperture 24 translating linearly along the two hollow cylinders 28, 32 (from right to left in FIGS. 2A-2D).

While not illustrated in FIGS. 2A-2D, an electrode 20 would extend through the two hollow cylinders 28, 32 and be configured to be operatively coupled to a voltage source 22. Lightning swept stroke simulator device 200 may be used with a bevel gearbox 38 and a motor 40 to operatively rotate the two hollow cylinders 28, 32 in opposite directions, as discussed herein.

Figure 3:
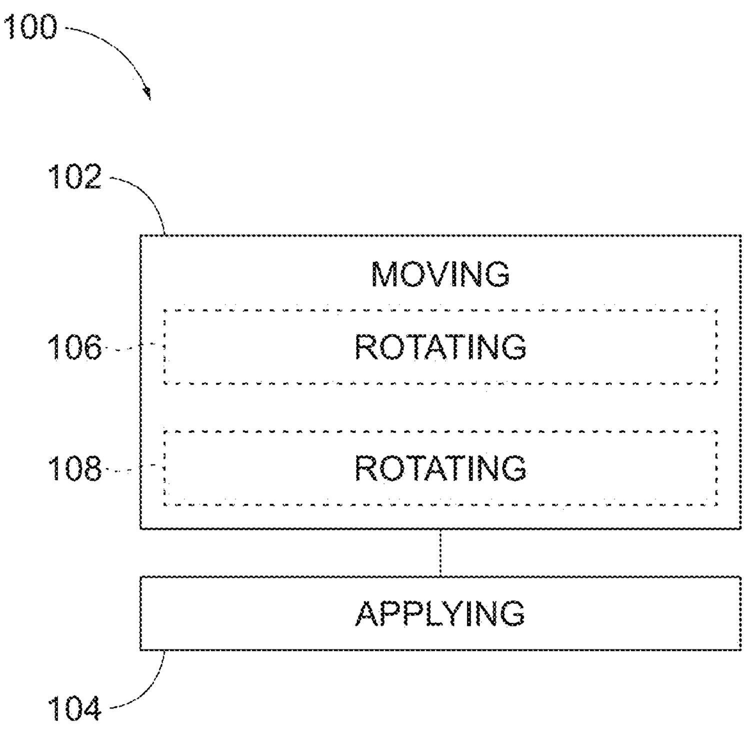
FIG. 3 is a flowchart schematically representing methods of simulating lightning swept stroke according to the present disclosure.

FIG. 3 schematically provides a flowchart that represents illustrative, non-exclusive examples of methods 100 according to the present disclosure. In FIG. 3, some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIG. 3 are not limiting and other methods and steps are within the scope of the present disclosure, including methods having greater than or fewer than the number of steps illustrated, as understood from the discussions herein.

As schematically represented in FIG. 3 and also with reference to the schematic representation of FIG. 1, methods 100 of simulating a lightning swept stroke comprise moving 102 a first dielectric structure 12 defining a first elongate slit 14 and a second dielectric structure 16 defining a second elongate slit 18 relative to each other so that the first elongate slit 14 and the second elongate slit 18 overlap and collectively define an aperture 24 that extends through the first dielectric structure 12 and the second dielectric structure 16 and that translates linearly along the first dielectric structure 12 and the second dielectric structure 16. Methods 100 further comprise, concurrently with the moving 102, applying 104 a voltage across the aperture 24 between an electrode 20 and a test structure 26 so that a plasma channel is formed through the aperture 24 as it translates linearly.

In some methods 100, the moving 102 results in linear translation of the aperture 24 at a supersonic velocity.

In some methods 100, and as discussed above in connection with some example lightning swept stroke simulator devices 10, the first dielectric structure 12 comprises a hollow cylinder 28 with a longitudinal axis 30, and the electrode 20 extends at least partially through the hollow cylinder 28. The hollow cylinder 28 is configured to be selectively rotated about the longitudinal axis 30 relative to the second dielectric structure 16. As schematically represented in FIG. 3, in such methods 100, the moving 102 therefore comprises rotating 106 the hollow cylinder 28 about the longitudinal axis 30 relative to the second dielectric structure 16. As also discussed above in in connection with some example lightning swept stroke simulator device 10, in some such examples, the second dielectric structure 16 comprises a second hollow cylinder 32, and the first hollow cylinder 28 extends through and is coaxial with the second hollow cylinder 32. In such examples, an outer surface 34 of the first hollow cylinder 28 is in close proximity to an inner surface 36 of the second hollow cylinder 32, and the second hollow cylinder 32 is configured to be selectively rotated about the longitudinal axis 30 relative to the first hollow cylinder 28 in a direction opposite the first hollow cylinder 28. As schematically represented in FIG. 3, in such methods 100, the moving 102 comprises rotating 108 the first hollow cylinder 28 and the second hollow cylinder 32 in opposite directions about the longitudinal axis 30 relative to each other. In some such methods 100, the rotating 108 comprises rotating the first hollow cylinder 28 and the second hollow cylinder 32 in opposite directions about the longitudinal axis 30 relative to each other at the same rate.

Illustrative, non-exclusive examples of inventive subject matter according to the present disclosure are described in the following enumerated paragraphs:

A. A lightning swept stroke simulator device (10), comprising:

a first dielectric structure (12) defining a first elongate slit (14);

a second dielectric structure (16) defining a second elongate slit (18); and an electrode (20) positioned relative to the first dielectric structure (12) and the second dielectric structure (16) and configured to be operatively coupled to a voltage source (22);

wherein the first dielectric structure (12) and the second dielectric structure (16) are configured to be selectively moved relative to each other so that the first elongate slit (14) and the second elongate slit (18) overlap and collectively define an aperture (24) that extends through the first dielectric structure (12) and the second dielectric structure (16) and that translates linearly along the first dielectric structure (12) and the second dielectric structure (16).

A1. The lightning swept stroke simulator device (10) of paragraph A, further comprising:

the voltage source (22) operatively coupled to the electrode (20) and configured to be operatively coupled to a test structure (26).

A1.1. The lightning swept stroke simulator device (10) of paragraph A1, further comprising:

the test structure (26) operatively coupled to the voltage source (22).

A1.1.1. The lightning swept stroke simulator device (10) of paragraph A1.1, wherein the test structure (26) is exposed to the electrode (20) only through the aperture (24).

A1.1.2. The lightning swept stroke simulator device (10) of any of paragraphs A1.1-A1.1.1, wherein the test structure (26) comprises an aerospace component (44).

A1.1.2.1. The lightning swept stroke simulator device (10) of paragraph A1.1.2, wherein the aerospace component (44) comprises an aircraft skin (46).

A1.1.2.1.1. The lightning swept stroke simulator device (10) of paragraph A1.1.2.1, wherein the aerospace component (44) further comprises fasteners (42) extending through the aircraft skin (46).

A1.1.3. The lightning swept stroke simulator device (10) of any of paragraphs A1.1-A1.1.2.1.1, wherein the test structure (26) comprises a composite material.

A1.1.3.1. The lightning swept stroke simulator device (10) of paragraph A1.1.3, wherein the composite material is a fiber-reinforced composite material.

A2. The lightning swept stroke simulator device (10) of any of paragraphs A-A1.1.3.1, wherein the first dielectric structure (12) comprises a first hollow cylinder (28) with a longitudinal axis (30), wherein the electrode (20) extends at least partially through the first hollow cylinder (28), and wherein the first hollow cylinder (28) is configured to be selectively rotated about the longitudinal axis (30) relative to the second dielectric structure (16).

A2.1. The lightning swept stroke simulator device (10) of paragraph A2, wherein the second dielectric structure (16) comprises a second hollow cylinder (32), wherein the first hollow cylinder (28) extends through and is coaxial with the second hollow cylinder (32), wherein an outer surface (34) of the first hollow cylinder (28) is in close proximity to an inner surface (36) of the second hollow cylinder (32), and wherein the second hollow cylinder (32) is configured to be selectively rotated about the longitudinal axis (30) relative to the first hollow cylinder (28) in a direction opposite the first hollow cylinder (28).

A2.1.1. The lightning swept stroke simulator device (10) of paragraph A2.1, wherein the first elongate slit (14) is at least partially helical about the longitudinal axis (30).

A2.1.2. The lightning swept stroke simulator device (10) of any of paragraphs A2.1-A2.1.1, wherein the second elongate slit (18) is at least partially helical about the longitudinal axis (30).

A2.1.2.1. The lightning swept stroke simulator device (10) of paragraph A2.1.2, wherein both the first elongate slit (14) and the second elongate slit (18) are at least partially helical about the longitudinal axis (30) and the first elongate slit (14) has an opposite handedness as the second elongate slit (18).

A2.1.2.1.1. The lightning swept stroke simulator device (10) of paragraph A2.1.2.1, wherein the first elongate slit (14) extends at least 90 degrees around the first hollow cylinder (28) and the second elongate slit (18) extends at least 90 degrees around the second hollow cylinder (32).

A2.1.2.1.1.1. The lightning swept stroke simulator device of paragraph A2.1.2.1.1, wherein the aperture (24) translates linearly from respective first end points to respective second end points of the first elongate slit (14) and the second elongate slit (18) as the first hollow cylinder (28) and the second hollow cylinder (32) are rotated relative to each other.

A2.1.3. The lightning swept stroke simulator device (10) of any of paragraphs A2.1-A2.1.2.1.1.1, wherein the first hollow cylinder (28) and the second hollow cylinder (32) are operatively coupled together to rotate in opposite directions about the longitudinal axis (30) at the same rate.

A2.1.3.1. The lightning swept stroke simulator device (10) of paragraph A2.1.3, further comprising a bevel gearbox (38) operatively coupled to the first hollow cylinder (28) and to the second hollow cylinder (32).

A2.1.4. The lightning swept stroke simulator device (10) of any of paragraphs A2.1-A2.1.3.1, further comprising a motor (40) operatively coupled to the to the first hollow cylinder (28) and to the second hollow cylinder (32) and configured to operatively rotate the first hollow cylinder (28) and the second hollow cylinder (32) in opposite directions at the same rate.

A3. The lightning swept stroke simulator device (10) of any one of paragraphs A-A2.1.4, wherein the first elongate slit (14) and the second elongate slit (18) each have a width of at least 0.5 centimeters (cm) and at most 1.5 cm.

A4. The lightning swept stroke simulator device (10) of any of paragraphs A-A3, wherein the first dielectric structure (12) and the second dielectric structure (16) are configured to be selectively moved relative to each other so that the aperture (24) translates linearly at a supersonic velocity.

B. A method (100) of simulating a lightning swept stroke, the method (100) comprising:

moving (102) a first dielectric structure (12) defining a first elongate slit (14) and a second dielectric structure (16) defining a second elongate slit (18) relative to each other so that the first elongate slit (14) and the second elongate slit (18) overlap and collectively define an aperture (24) that extends through the first dielectric structure (12) and the second dielectric structure (16) and that translates linearly along the first dielectric structure (12) and the second dielectric structure (16); and concurrently with the moving (102), applying (104) a voltage across the aperture (24) between an electrode (20) and a test structure (26) so that a plasma channel is formed through the aperture (24) as it translates linearly.

B1. The method (100) of paragraph B, wherein the moving (102) results in linear translation of the aperture (24) at a supersonic velocity.

B2. The method (100) of any of paragraphs B-B1, wherein the test structure (26) comprises an aerospace component (44).

B2.1. The method (100) of paragraph B2, wherein the aerospace component (44) comprises an aircraft skin (46).

B2.1.1. The method (100) of paragraph B2.1, wherein the aerospace component (44) further comprises fasteners (42) extending through the aircraft skin (46).

B3. The method (100) of any of paragraphs B-B2.1.1, wherein the test structure (26) comprises a composite material.

B3.1. The method (100) of paragraph B3, wherein the composite material is a fiber-reinforced composite material.

B4. The method (100) of any of paragraphs B-B3.1, wherein the first dielectric structure (12) comprises a first hollow cylinder (28) with a longitudinal axis (30), wherein the electrode (20) extends at least partially through the first hollow cylinder (28), and wherein the first hollow cylinder (28) is configured to be selectively rotated about the longitudinal axis (30) relative to the second dielectric structure (16); and wherein the moving (102) comprises rotating (106) the first hollow cylinder (28) about the longitudinal axis (30) relative to the second dielectric structure (16).

B4.1. The method (100) of paragraph B4, wherein the second dielectric structure (16) comprises a second hollow cylinder (32), wherein the first hollow cylinder (28) extends through and is coaxial with the second hollow cylinder (32), wherein an outer surface (34) of the first hollow cylinder (28) is in close proximity to an inner surface (36) of the second hollow cylinder (32), and wherein the second hollow cylinder (32) is configured to be selectively rotated about the longitudinal axis (30) relative to the first hollow cylinder (28) in a direction opposite the first hollow cylinder (28); and wherein the moving (102) comprises rotating (108) the first hollow cylinder (28) and the second hollow cylinder (32) in opposite directions about the longitudinal axis (30) relative to each other.

B4.1.1. The method (100) of paragraph B4.1, wherein the first elongate slit (14) is at least partially helical about the longitudinal axis (30).

B4.1.2. The method (100) of any of paragraphs B4.1-B4.1.1, wherein the second elongate slit (18) is at least partially helical about the longitudinal axis (30).

B4.1.2.1. The method (100) of paragraph B4.1.2, wherein both the first elongate slit (14) and the second elongate slit (18) are at least partially helical about the longitudinal axis (30) and the first elongate slit (14) has an opposite handedness as the second elongate slit (18).

B4.1.2.1.1. The method (100) of paragraph B4.1.2.1, wherein the first elongate slit (14) extends at least 90 degrees around the first hollow cylinder (28) and the second elongate slit (18) extends at least 90 degrees around the second hollow cylinder (32).

B4.1.2.1.1.1. The method (100) of paragraph B4.1.2.1.1, wherein the aperture (24) translates linearly from respective first end points to respective second end points of the first elongate slit (14) and the second elongate slit (18) as the first hollow cylinder (28) and the second hollow cylinder (32) are rotated relative to each other.

B4.1.3. The method (100) of any of paragraphs B4.1-B4.1.2.1.1.1, wherein the rotating (108) comprises rotating the first hollow cylinder (28) and the second hollow cylinder (32) in opposite directions about the longitudinal axis (30) relative to each other at the same rate.

B5. The method (100) of any one of paragraphs B-B4.1.3, wherein the first elongate slit (14) and the second elongate slit (18) each have a width of at least 0.5 cm and at most 1.5 cm.

B6. The method (100) of any of paragraphs B-B5, wherein the voltage is at least 100 kilovolts and optionally no more than 500 megavolts.

B7. The method (100) of any of paragraphs B-B6, implemented by the lightning swept stroke simulator device (10) of any one of paragraphs A-A4.

C. Use of the lightning swept stroke simulator device (10) of any one of paragraphs A-A4 to simulate a lightning swept stroke.

D. Use of the lightning swept stroke simulator device (10) of any one of paragraphs A-A4 to perform the method (100) of any of paragraphs B-B7.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A lightning swept stroke simulator device, comprising:

a first dielectric structure defining a first elongate slit;

a second dielectric structure defining a second elongate slit; and an electrode positioned relative to the first dielectric structure and the second dielectric structure and configured to be operatively coupled to a voltage source;

wherein the first dielectric structure and the second dielectric structure are configured to be selectively moved relative to each other so that the first elongate slit and the second elongate slit overlap and collectively define an aperture that extends through the first dielectric structure and the second dielectric structure and that translates linearly along the first dielectric structure and the second dielectric structure.

2. The lightning swept stroke simulator device of claim 1, further comprising:

the voltage source operatively coupled to the electrode and configured to be operatively coupled to a test structure.

3. The lightning swept stroke simulator device of claim 2, further comprising:

the test structure operatively coupled to the voltage source, wherein the test structure is exposed to the electrode only through the aperture.

4. The lightning swept stroke simulator device of claim 3, wherein the test structure comprises an aerospace component.

5. The lightning swept stroke simulator device of claim 4, wherein the aerospace component comprises an aircraft skin.

6. The lightning swept stroke simulator device of claim 5, wherein the aerospace component further comprises fasteners extending through the aircraft skin.

7. The lightning swept stroke simulator device of claim 3, wherein the test structure comprises a composite material.

8. The lightning swept stroke simulator device of claim 7, wherein the composite material is a fiber-reinforced composite material.

9. The lightning swept stroke simulator device of claim 1, wherein the first dielectric structure comprises a first hollow cylinder with a longitudinal axis, wherein the electrode extends at least partially through the first hollow cylinder, and wherein the first hollow cylinder is configured to be selectively rotated about the longitudinal axis relative to the second dielectric structure.

10. The lightning swept stroke simulator device of claim 9, wherein the second dielectric structure comprises a second hollow cylinder, wherein the first hollow cylinder extends through and is coaxial with the second hollow cylinder, wherein an outer surface of the first hollow cylinder is in close proximity to an inner surface of the second hollow cylinder, and wherein the second hollow cylinder is configured to be selectively rotated about the longitudinal axis relative to the first hollow cylinder in a direction opposite the first hollow cylinder.

11. The lightning swept stroke simulator device of claim 10, wherein the first elongate slit is at least partially helical about the longitudinal axis, wherein the second elongate slit is at least partially helical about the longitudinal axis, and wherein the first elongate slit has an opposite handedness as the second elongate slit.

12. The lightning swept stroke simulator device of claim 11, wherein the first elongate slit extends at least 90 degrees around the first hollow cylinder and the second elongate slit extends at least 90 degrees around the second hollow cylinder.

13. The lightning swept stroke simulator device of claim 10, wherein the first hollow cylinder and the second hollow cylinder are operatively coupled together to rotate in opposite directions about the longitudinal axis at the same rate.

14. The lightning swept stroke simulator device of claim 10, further comprising a motor operatively coupled to the first hollow cylinder and to the second hollow cylinder and configured to operatively rotate the first hollow cylinder and the second hollow cylinder in opposite directions at the same rate.

15. The lightning swept stroke simulator device of claim 1, wherein the first elongate slit and the second elongate slit each have a width of at least 0.5 centimeters (cm) and at most 1.5 cm.

16. The lightning swept stroke simulator device of claim 1, wherein the first dielectric structure and the second dielectric structure are configured to be selectively moved relative to each other so that the aperture translates linearly at a supersonic velocity.

17. A method of simulating a lightning swept stroke, the method comprising:

moving a first dielectric structure defining a first elongate slit and a second dielectric structure defining a second elongate slit relative to each other so that the first elongate slit and the second elongate slit overlap and collectively define an aperture that extends through the first dielectric structure and the second dielectric structure and that translates linearly along the first dielectric structure and the second dielectric structure; and concurrently with the moving, applying a voltage across the aperture between an electrode and a test structure so that a plasma channel is formed through the aperture as it translates linearly.

18. The method of claim 17, wherein the moving results in linear translation of the aperture at a supersonic velocity.

19. The method of claim 17, wherein the test structure comprises an aerospace component.

20. The method of claim 17, wherein the test structure comprises a composite material.

* * * * *